United States Patent

[11] 3,588,734

[72] Inventor George R. Welti
Leesburg, Va.

[21] Appl. No. 817,919
[22] Filed Apr. 21, 1969
[45] Patented June 28, 1971

[73] Assignee Westinghouse Electric Corporation
Pittsburgh, Pa.

[54] NON-LINEAR PHASE DETECTOR
10 Claims, 4 Drawing Figs.

[52] U.S. Cl. ........ 331/12, 307/232, 328/133, 331/25
[51] Int. Cl. ........ H03b 3/04, H03d 13/00
[50] Field of Search ........ 331/11, 12, 25; 328/133, 134; 307/232

[56] References Cited

UNITED STATES PATENTS

| | | | |
|---|---|---|---|
| 3,101,448 | 8/1963 | Costas | 331/12X |
| 3,336,534 | 8/1967 | Gluth | 331/12 |
| 3,403,355 | 9/1968 | Takada | 331/25X |

*Primary Examiner*—Roy Lake
*Assistant Examiner*—Siegfried H. Grimm
*Attorneys*—F. H. Henson and E. P. Klipfel

ABSTRACT: Phase responsive circuitry wherein a nonlinear response to phase error is obtained by providing first and second phase detectors, each for comparing the phase of an input to a reference signal with triggering means responsive to the output of each phase detector. The first triggering means provides a large positive level output and a large negative output when its input is positive and negative, respectively. A second triggering means enables a ate to pass the output from said first triggering means to a summing circuit whereby the output from said phase responsive circuitry is nonlinearly increased for phase errors exceeding a predetermined difference.

WITNESSES:
Bernard R. Gieguer
James F. Young

INVENTOR
George R. Welti
BY Ernest P. Klipfel
ATTORNEY

NON-LINEAR PHASE DETECTOR

BACKGROUND OF THE INVENTION

1. Field of the Invention

The present invention relates generally to phase responsive circuitry and more particularly relates to nonlinear phase detectors for phase-locked loops and the like.

2. Description of the Prior Art

Conventional phase detectors have response characteristics which are insufficient when the initial phase error or difference is near an odd multiple of $\pi$ radians.

Such limited response results in phase-locked loops requiring many carrier cycles to synchronize. So-called linear phase detectors provide better response characteristics thereby allowing relatively fast synchronization in a locked loop circuit, as fast as 10 cycles for the worst initial condition. Unfortunately the implementation of linear phase detectors is relatively complex. The inherent delays introduced by linear phase detection circuits can cause loop instabilities which can only be remedied by reduction in loop gain and consequent increase in synchronization time of a phase-locked loop.

SUMMARY OF THE INVENTION

An object of the present invention is to provide phase responsive circuitry having a nonlinear output.

Another object of the present invention is to provide phase responsive circuitry which when used in a phase-locked loop provides faster synchronization time, simpler implementation and more stable loop operation than heretofore available.

Briefly, the present invention accomplishes the above-cited objects as well as other objects and advantages by providing for circuitry for comparing an input and a reference signal of different phase and producing an output signal which is proportional to the phase difference for small phase differences but providing an output signal which is a larger nonlinear function of the phase difference for large phase differences between the two signals being compared. The output also indicates the polarity of the phase difference. In phase locked oscillator control loops short synchronization time is thereby achieved.

BRIEF DESCRIPTION OF THE DRAWINGS

Further objects and advantages of the present invention will be more readily apparent from the following detail description taken in conjunction with the drawings in which:

FIG. 1 shows the configuration of the essential elements of a phase-locked loop. In general, the input carrier signal 2 may or may not be amplitude or frequency modulated. The phase detector is a time varying nonlinear element whose average output is a periodic function of the phase difference between the input carrier 2 and a reference signal 6 fed back from a voltage controlled oscillator 8. A filter 10 connects the nonlinear response output from the phase detector 4 to the voltage controlled oscillator 8 to change its frequency in such a way as to pull it into exact correspondence with the signal input 2. The voltage controlled oscillator 8 provides an output 12 represented by cos $[\omega(f)t+\Phi]$ where $\omega(f)$ is proportional to the input 14 to the oscillator 8 at time, $t$. The output 12 is returned to the phase detector 4 as a reference input signal 6 to complete the feedback loop.

Figure 2:
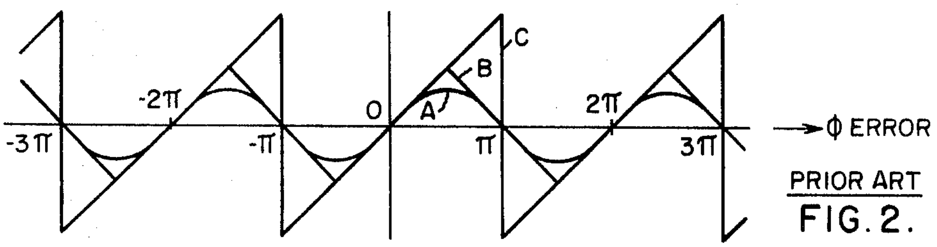
FIG. 2 is a graphical representation of conventional responses obtainable with circuitry of the prior art.

Conventional phase detectors have response characteristics such as curves A and B in FIG. 2. Phase-locked loops with conventional phase detectors require many carrier cycles to synchronize when the initial phase error is near an odd multiple 4 $\pi$ radians. In many instances, the synchronization time will typically exceed 20 cycles. So-called linear phase detectors with response characteristics such as curve C in FIG. 2 can give relatively fast synchronization—as fast as 10 cycles for the worst initial condition. However, the implementation of linear phase detectors is relatively complex. The inherent delays introduced by linear phase detection circuits can cause loop instabilities which can also be remedied by reduction in loop gain and consequent increase in synchronization time.

Figure 3:
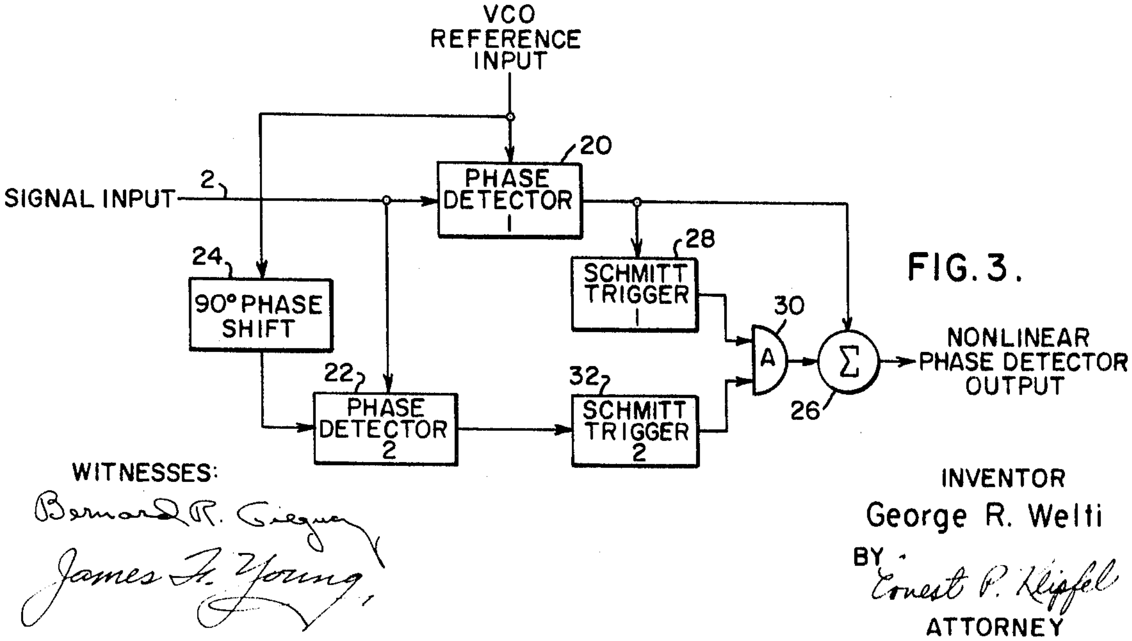
FIG. 3 is a schematic block diagram of an illustrative embodiment of the present invention.

A nonlinear phase detector capable of providing faster synchronization time and more stable loop operation is shown in the illustrative embodiment of FIG. 3. The input signal 2 is connected to phase detectors 20 and 22. The other input to the phase detector 20 is a reference signal, which can be from a voltage controlled oscillator. The other input to the phase detector 22 is also the reference input but shifted in phase by a 90° phase shift circuit 24.

Figure 4:
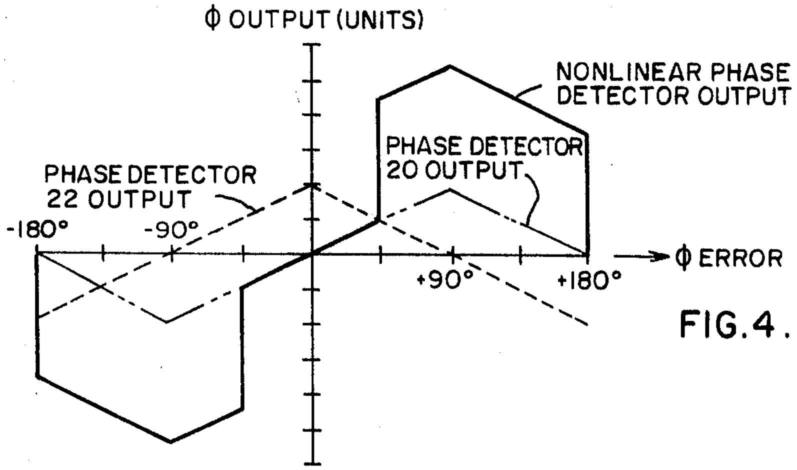
FIG. 4 is a graphic illustration of the response characteristics obtainable when practicing the invention.

The output of the first phase detector 20 is as shown by the staggered curve in FIG. 4. This output is fed to a summing circuit 26 and also to a trigger 28. Schmitt trigger 28 has a bipolar output and will produce a large positive level output when its input is positive, and a large negative output when its input is negative. The output from the Schmitt trigger 28 however will not be allowed through to the summing circuit 26 by a gate 30 until the gate 30 is enabled. Such an enabling circuit is provided by a Schmitt trigger 32. The Schmitt trigger 32 is adjusted to trigger when the phase error exceeds 45°. Schmitt trigger 32 will only provide an enabling signal when the phase error exceeds a predetermined value when compared with the nonshifted reference signal.

Upon being enabled, the gate 30 allows the output from the Schmitt trigger 28 to be summed with the output of the phase detector 20. Thus, a nonlinear phase detector response characteristic is obtained as shown by the solid lined curve of FIG. 4.

From FIG. 4, it can be seen that the Schmitt trigger 28 increases the output of the phase detector for errors over 45° by adding a constant voltage to the output of the phase detector 20.

When the phase detector 22 has an output exceeding one unit then the Schmitt trigger 32 assumes an output state herein designated as a zero. When the phase detector 22 has an output less than one unit then the trigger 32 has an output herein designated as a binary one, thereby enabling the gate 30.

The Schmitt trigger 28 provides a large positive or large negative signal which is responsive to the polarity of the phase shift of the input compared to the reference signal. The output of the Schmitt trigger 28 however is not connected to the summing circuit 26 until an enabling signal is present at the gate 30. The result is, from FIG. 4, that a nonlinear output will occur when the phase error exceeds a predetermined value herein designated as 45°.

Figure 1:
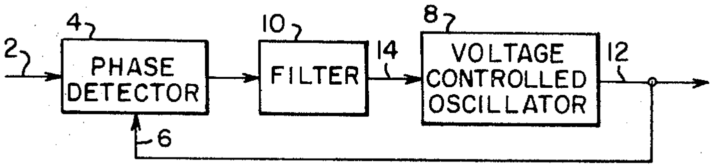
FIG. 1 is a schematic block diagram of one use of the present invention.

While the present invention has been described with a degree of particularity for the purpose of illustration, it is to be understood that all modifications, alterations and substitutions within the spirit and scope of the present invention are herein meant to be inclined. For example, when the nonlinear phase detector is used in a phase-locked loop such as shown in FIG. 1, the output from the summing circuit 26 is connected to the filter 10 and the reference input is derived from the voltage controlled oscillator 8. Of course, other uses of the nonlinear phase detector in accordance with the present invention may also be made.

I claim:

1. Phase responsive circuitry comprising, in combination; first and second phase detectors; means for applying an input, the phase of which is to be detected, to said first and second phase detectors; means for applying a reference input to said first phase detector; means for applying a phase shifted reference input to said second phase detector; first triggering means for providing an output signal of one polarity when the phase is leading the reference input and an output signal of other polarity when the phase is lagging the reference input;

means for summing the output from said first phase detector with the output from said first triggering means; gating means for connecting the output from said first triggering means to said summing means; and second triggering means for providing an enabling signal to said gating means when said input exceeds the reference input by a predetermined phase difference.

2. The circuitry of claim 1 wherein said first and second phase detectors each provide an output responsive to the phase difference between said input and the reference input.

3. The circuitry of claim 1 wherein the phase shifted reference input applied to said second phase detector is 90° displaced in phase from the reference input to said first phase detector.

4. The circuitry of claim 1 wherein the predetermined phase difference, which when exceeded causes said second triggering means to provide said enabling signal, is 45°.

5. The circuitry of claim 1 wherein said first triggering means is a Schmitt trigger having a bipolar output and which will produce a large positive level output when its input is positive, and a large negative output when its input is negative.

6. The circuitry of claim 1 wherein said second triggering means is a Schmitt trigger providing an enabling signal to said gating means when the output of said second phase shifting means is less than a predetermined magnitude.

7. The combination of claim 1, further including; filter means for filtering noise from the output of said means for summing; voltage controlled oscillator means responsive to the filtered output for providing a signal which follows the phase of said input being detected; and means for feeding back the output from said voltage controlled oscillator means as said reference signal.

8. The combination of claim 7, wherein said filter means is a low pass filter with narrow pass bandwidth.

9. The circuitry of claim 7 wherein said filter means is linear and time invariant.

10. The circuitry of claim 9 wherein said voltage controlled oscillator means produces an output cos $[\omega(f)t+\Phi]$ where $\omega(f)$ is proportional to said filtered output at time $t$.